(12) United States Patent
Qi

(10) Patent No.: US 7,600,259 B2
(45) Date of Patent: Oct. 6, 2009

(54) CRITICAL PERIOD PROTECTION

(75) Inventor: Fei Qi, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 811 days.

(21) Appl. No.: 11/148,965

(22) Filed: Jun. 8, 2005

(65) Prior Publication Data

US 2006/0282896 A1 Dec. 14, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. .............................. 726/25; 713/166; 726/23

(58) Field of Classification Search ................. 713/166; 726/22, 23, 25
See application file for complete search history.

(56) References Cited

U.S. PATENT DOCUMENTS

| | | | | |
|---|---|---|---|---|
| 5,724,027 A * | 3/1998 | Shipman et al. ................ 726/16 |
| 5,757,271 A * | 5/1998 | Andrews .................. 340/568.1 |
| 6,249,872 B1 * | 6/2001 | Wildgrube et al. .............. 726/2 |
| 6,385,727 B1 * | 5/2002 | Cassagnol et al. ............ 713/193 |
| 6,560,732 B2 * | 5/2003 | Boehm et al. ................ 714/719 |
| 6,934,664 B1 * | 8/2005 | Webb et al. .................. 702/188 |
| 7,086,258 B2 * | 8/2006 | Fisher et al. ................ 70/278.7 |
| 7,129,837 B2 * | 10/2006 | Shannon et al. ......... 340/539.13 |
| 7,420,456 B2 * | 9/2008 | Fisher ......................... 340/5.73 |
| 2002/0046385 A1 * | 4/2002 | Boehm et al. ................ 714/799 |
| 2002/0129245 A1 * | 9/2002 | Cassagnol et al. ............ 713/168 |
| 2004/0227630 A1 * | 11/2004 | Shannon et al. ......... 340/539.22 |
| 2005/0125685 A1 * | 6/2005 | Samuelsson et al. ......... 713/200 |
| 2005/0206499 A1 * | 9/2005 | Fisher ......................... 340/5.73 |
| 2005/0207087 A1 * | 9/2005 | Fisher et al. ................. 361/160 |
| 2005/0251854 A1 * | 11/2005 | Shay .............................. 726/2 |
| 2005/0256957 A1 * | 11/2005 | Shay .......................... 709/225 |
| 2005/0257249 A1 * | 11/2005 | Shay ............................. 726/3 |
| 2005/0262569 A1 * | 11/2005 | Shay ........................... 726/26 |
| 2005/0262570 A1 * | 11/2005 | Shay ........................... 726/26 |
| 2005/0268342 A1 * | 12/2005 | Shay ........................... 726/26 |
| 2006/0103528 A1 * | 5/2006 | Leyden ..................... 340/568.1 |
| 2006/0174319 A1 * | 8/2006 | Kraemer et al. ................ 726/1 |
| 2006/0179483 A1 * | 8/2006 | Rozas .......................... 726/22 |
| 2007/0226795 A1 * | 9/2007 | Conti et al. .................... 726/22 |

* cited by examiner

*Primary Examiner*—David Garcia Cervetti
(74) *Attorney, Agent, or Firm*—Gunnison, McKay & Hodgson, L.L.P.; Serge J. Hodgson

(57) ABSTRACT

Systems and methods for protecting a computer during a period of increased vulnerability. In one implementation, a method for protecting a computer is provided. The method includes monitoring a computing device having an first security state for one or more events indicating a time period of increased vulnerability. The method includes adjusting one or more security policies in response to the one or more events to generate a second security state. The method also includes identifying an end of the time of increased vulnerability, and restoring the computing to the first security state. In one implementation, the computer is an embedded device.

18 Claims, 5 Drawing Sheets

CRITICAL PERIOD PROTECTION

BACKGROUND

The present invention relates to computer security.

Computer systems can include a plurality of computing devices joined together in a network communication system connecting a plurality of users. A packet is the fundamental unit of transfer in a packet switch communication system. A user can be an individual user terminal or another network.

The network can be an intranet, that is, a network connecting one or more private servers such as a local area network ("LAN"). Alternatively, the network can be a public network, such as the Internet, in which data packets are passed over untrusted communication links. The network configuration can include a combination of public and private networks. For example, two or more LAN's can be coupled together with individual terminals using a public network such as the Internet. When public and private networks are linked, data security issues arise. More specifically, conventional packet switch communication systems that include links between public and private networks typically include security measures for assuring data integrity.

To ensure security of communications, network designers have either incorporated security devices, such as firewalls, intrusion prevention devices, and traffic management devices, into the computer system or have enhanced network components such as routers to provide security functions. In addition to security concerns for the data transferred over the public portion of the communications system, the private portions of the network must safeguard against intrusions through one or more gateways provided at an interface between the private and the public networks. For example, a firewall is a device that can be coupled in-line between a public network and private network for screening packets received from the public network. A firewall can include one or more engines for inspecting, filtering, authenticating, encrypting, decrypting and otherwise manipulating received packets. In a conventional firewall, received packets are inspected and thereafter forwarded or dropped in accordance with the security policies associated with a given domain.

Security systems are often employed in computer systems to protect the computer system, for example, from various outside attacks. Conventional computer systems can have events occur, which cause the computer system to be more vulnerable to an attack for a period of time then during other times. A period of time in which a computer system is more vulnerable can be referred to as a critical period. A critical period can be a period of time in which a computer system can have permanent changes made. Typically, a period of time during which computer firmware is being installed is a critical period.

Certain operations or attacks can damage a typical computer system during a critical period, which if occurring outside of a critical period would not cause harm. For example, a computer reboot typically will not damage a computer system, however if the reboot occurs while installing computer firmware (i.e., during a critical period), the computer system can be damaged. In another example, a computer system is typically immune from network scans searching for vulnerabilities, but can be vulnerable to the same scans during a critical period.

SUMMARY

Systems and methods for protecting a computer during a period of increased vulnerability. In general, in one aspect, the present specification provides a method. The method includes monitoring a computing device having an first security state for one or more events indicating a time period of increased vulnerability. The method includes adjusting one or more security policies in response to the one or more events to generate a second security state. The method also includes identifying an end of the time of increased vulnerability, and restoring the computing to the first security state.

Advantageous implementations of the method can include one or more of the following features. The method can further include verifying the changes to the computing device during the time period of increased system vulnerability. The monitoring can further include monitoring a behavior of one or more applications, a behavior of an enhanced write filter, input traffic over a network, and one or more registry entries. The adjusting can further include adjusting one or more security policies to restrict network access, initiating a virus scan of the computing device memory, and disabling unnecessary devices coupled to the computing device. The method can further include monitoring a plurality of computing devices for one or more events indicating a time of increased vulnerability.

In general, in one aspect, the specification provides a security device. The security device includes a monitoring engine operable to monitor a computing device for events indicating a time period of increased system vulnerability. The security device includes a security engine operable to execute one or more security policies and a policy module operable to store the one or more security policies.

Advantageous implementations of the system can include one or more of the following features. The system can further include a verification engine operable to verify one or more changes to a computer system during the time period of increased system vulnerability. The monitoring engine can further include an application behavior monitor and a network monitor. The monitoring engine can be operable to monitor one or more of a network traffic, a behavior of an application, a file modification, and a registry entry change. The computing device can be an embedded device. The system can further include a policy module including one or more security policies. The security engine can be operable to dynamically adjust one or more security policies in response to a triggering condition.

In general, in one aspect, the specification provides an embedded device. The embedded device includes a security device operable to adjust one or more security policies during a time of increased device vulnerability and an enhanced write filter operable to write data to an overlay.

The invention can be implemented to realize one or more of the following advantages. A computing device can be monitored for events indicating that the computing device is entering a time in which the computing device is more vulnerable to outside attack. Triggering events can be detected and a security system can dynamically adjust security policies during the time in which the computing device is more vulnerable to attack to enhance security. The security device can monitor application behavior and network traffic events indicative of a period of increased vulnerability.

The security device can respond to a resultant triggering condition by adjusting security policies to limit access to the more vulnerable computing device. Network traffic can be blocked from the affected computing device. Other, unnecessary, devices can be disabled during the period of increased vulnerability. Disabling unnecessary devices and network resources can reduce CPU usage allowing the activity causing the increased vulnerability to be completed more quickly. Reducing the period of increased vulnerability can reduce system costs. The security device can also prevent particular operations from being interrupted during the period of increased vulnerability. Modifications to the computing device during the period of increased vulnerability can be verified to ensure that the correct changes were made. Once the period of increased vulnerability has passed, the security device can again adjust security policies to return the computing device to the security state prior to the triggering condition or other reduced heightened state.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
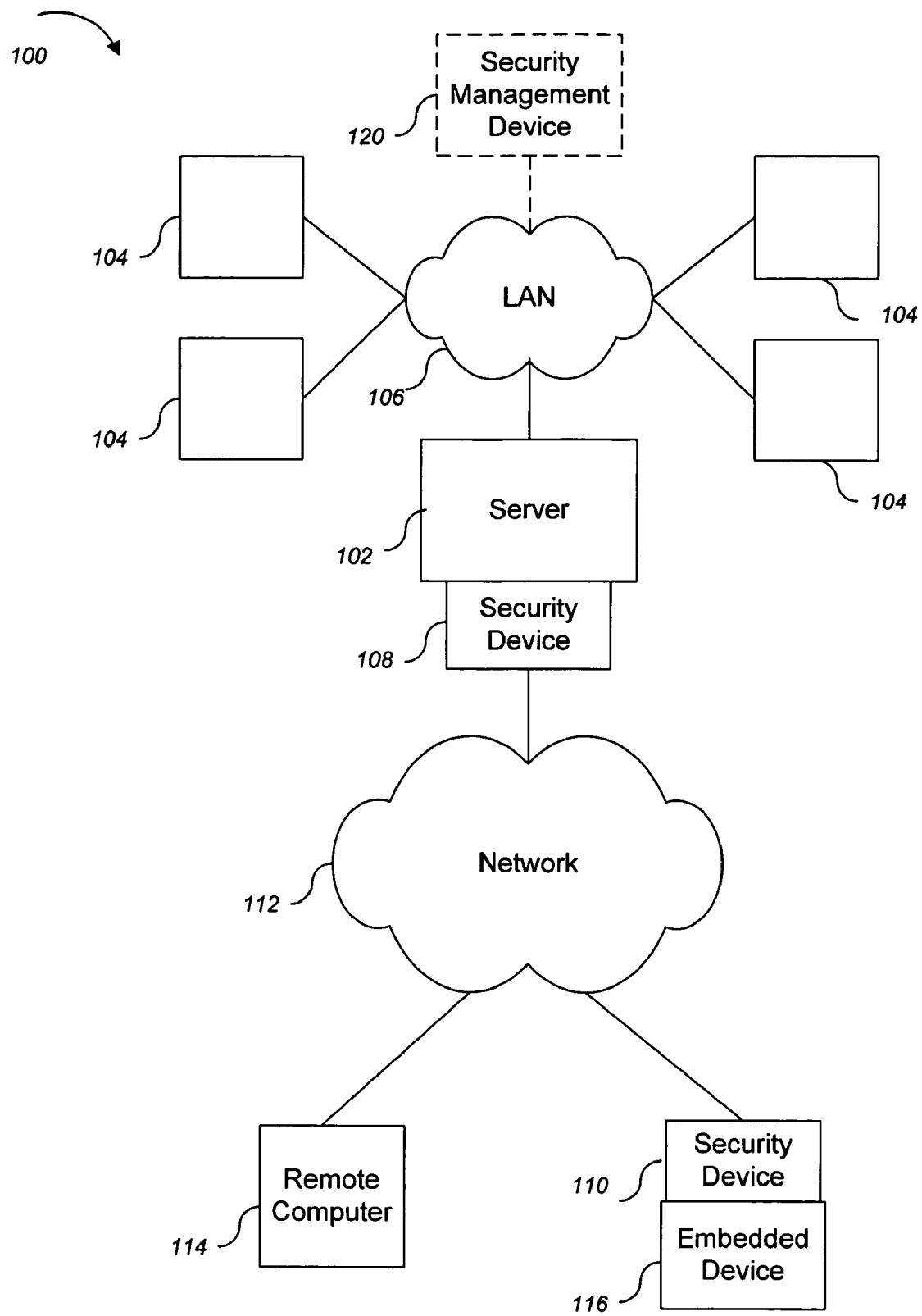
FIG. 1 shows an implementation of a network computer system.

In FIG. 1, a network computer system 100 is shown. The network computer system 100 (e.g., an enterprise system) can include several different networked components. The network computer system 100 includes a server 102 and workstations 104 coupled by a LAN 106. The network computer system 100 also includes security devices 108 and 110 (e.g., a firewall or intrusion detection device). A remote computer 114, and a remote embedded device 116 are coupled to the server 102 through a network 112. Security devices 108 and 110 can be used to protect devices in the network computer system 100 from an attack.

The network computer system 100 can include one or more security devices (e.g., security devices 108 and 110). Individual security devices can have specialized functions such as firewall functions and an intrusion detection/prevention functions. In one implementation, the computer system 100 can include an optional security management device 120 responsible for maintaining one or more of the individual security devices. For example, the security management device 120 can coordinate the operation of individual devices and adjust security policies for security devices as necessary. A number of security policies or rules can define characteristics and access control protocols for various devices in or connected to the computer system 100. The security management device can communicate with various individual security devices throughout the computer system 100 across LAN 106 and network 112. Communications can include providing instructions to individual devices and updates (e.g., security policy updates, software updates). Additionally, the security devices can act in response to a security threat or can report an alert to the security management device in response to an attack or other event. In one implementation, the security device reports to the security management device when an event occurs and the security management device determines a response.

Figure 2:
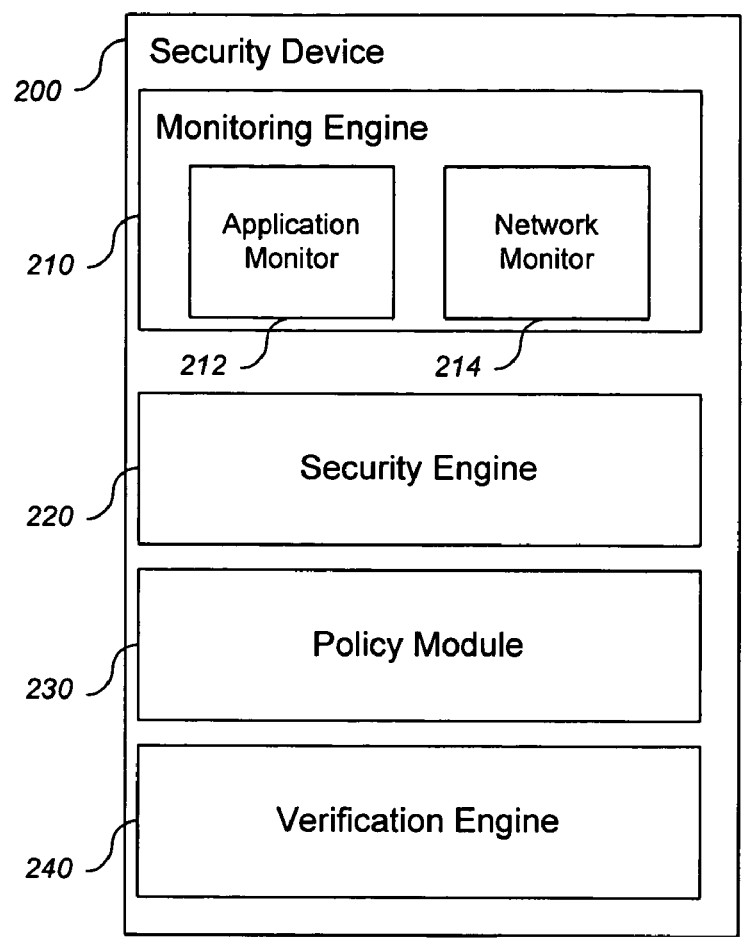
FIG. 2 shows an implementation of a security device.

FIG. 2 shows one implementation of a security device 200 provided for protecting computer system 100 during a time of increased vulnerability (e.g., during a critical period). In one implementation, the security device 200 protects the security system 100 at an endpoint of a single computing device such as embedded device 116. In another implementation, protecting the security system 100 includes protecting a plurality of computing devices including the entire security system 100. The security device 200 includes a monitoring engine 210, security engine 220, policy module 230, and a verification engine 240. In one implementation, the monitoring engine 210 includes an application monitor 212 and a network monitor 214.

The monitoring engine 210 can monitor one or more computing devices for events indicating an increased period of vulnerability. The monitoring engine 210 can include an application monitor 212 and a network monitor 214. The application monitor can monitor, for example, the behavior of one or more applications. The network monitor 214 can monitor, for example, packet traffic to and from a computing device.

The security engine 220 can implement one or more security policies included in policy module 230. The security engine 220 can increase the security state of the security device 200 during periods of increased vulnerability and can reduce the security state once the period of increased vulnerability has ended. The policy module 230 includes one or more security policies defining triggering conditions and security features defining levels of security protection for different security states. The verification engine 240 can verify that any modifications made to the computing device during the period of increased vulnerability match an intended change to the computing device.

Figure 3:
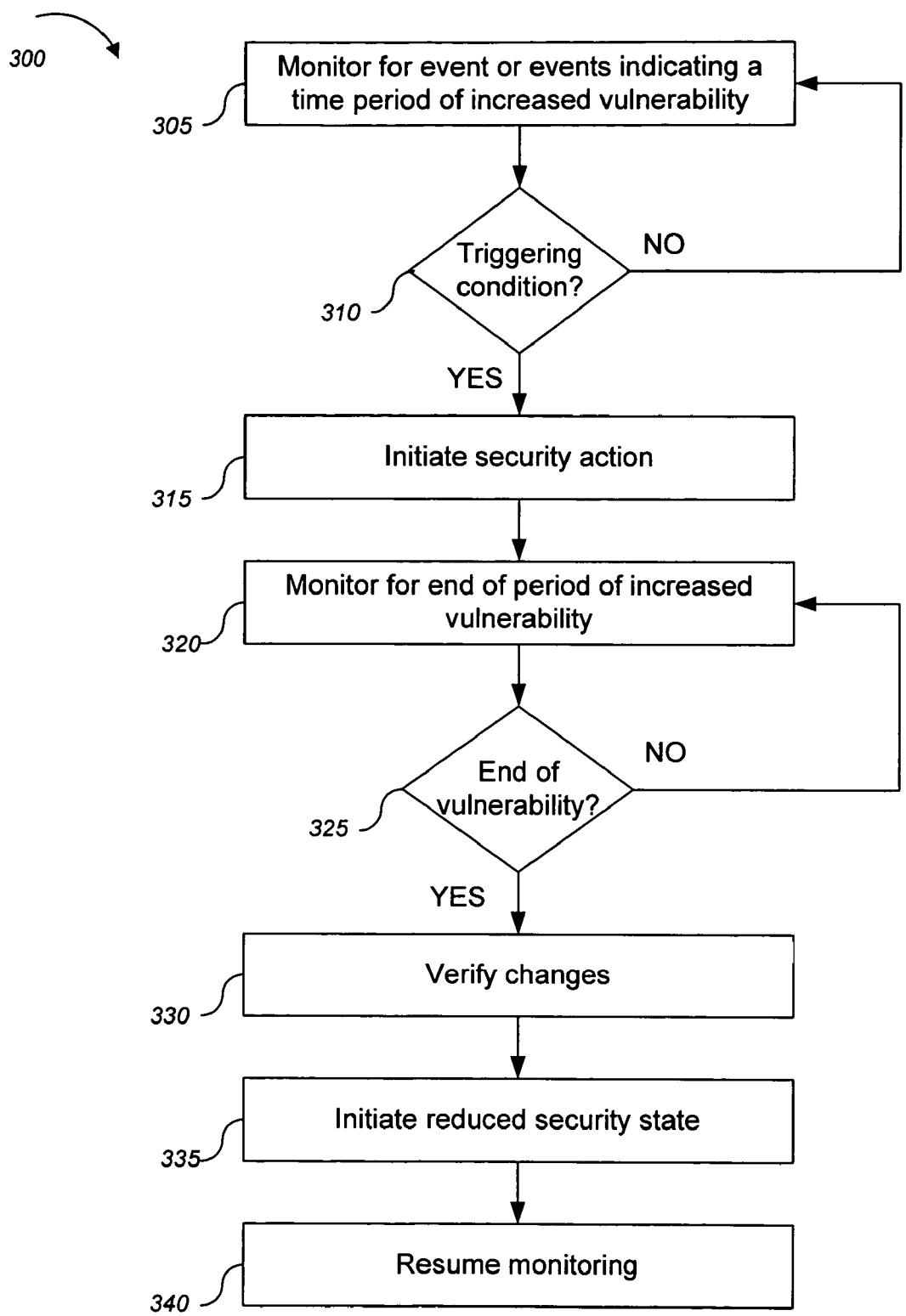
FIG. 3 shows a process for protecting a computer during a period of increased vulnerability.

The security device 200 can be configured to monitor one or more computing devices to identify a period of time in which the associated devices in the network computer system 100 are more vulnerable to an attack. FIG. 3 illustrates one implementation of a process 300 for protecting a computer resource during periods of increased vulnerability to attack. A triggering condition can be identified using one or more security policies based on the occurrence of one or more events. A security device (e.g., security device 200) can monitor a computer system (e.g., network computer system 100) for one or more events that can indicate a period of increased vulnerability (step 305). A monitoring engine (e.g., monitoring engine 210) monitors events to identify a triggering condition (step 310). If a triggering condition is identified, the security device can initiate a security action (e.g., using a security engine 220) (step 315). If a triggering condition is not identified (step 310) the monitoring engine continues monitoring the computer system for events (step 305).

The security action taken when the triggering condition is identified can raise the security state to a heightened level and act to protect the computer system, or a particular computer device within the computer system, from an attack during a particular period of time in which the computer system or protected device is at a higher risk of attack. After the security engine initiates the security action, the monitoring engine can continue to monitor the computer system for an indication that the event or events resulting in the increased vulnerability has passed (step 320). If an end of the period of increased vulnerability is detected by the monitoring engine (step 325), the security device can verify any changes to the computer system (e.g., using a verification engine 240) (step 330). After verifying the changes, the security device can then resume a same security state prior to the triggering condition and continue monitoring the computer system for a next event or events causing a triggering condition to occur (step 335). In an alternative implementation, after the period of increased vulnerability has ended, the security device 200 can establish a security state that is reduced from the heightened security level but different from the security state prior to the triggering condition.

Monitoring the computer system for one or more triggering events in step 305 can include monitoring a behavior of one or more applications as well as monitoring intercepted network packet traffic. The monitoring engine can include an application monitor (e.g., application monitor 212) for monitoring application behavior and a network monitor (e.g., network monitor 214) for monitoring incoming and outgoing network traffic. Applications can include software and drivers from an operating system for a particular computing device as well as third-party software and drivers. In one implementation, the application monitor monitors the applications for behavior indicating that the application is going to perform a permanent change to a monitored device in the computer system. In one implementation, a permanent change is a change in which information stored on media or hardware in the computing device is changed such that the change is persistent following re-initialization of the affected hardware or software.

Behavior monitored by the monitoring engine can include input/output ("I/O") commands to or from a particular application. The I/O commands can be to or from local or remote computing devices or systems. In one implementation, the monitored I/O commands include commands to read/write/delete registry entries (e.g., creating a new registry key), commands to read/write/delete a file, commands to read/write to memory, commands to read/write/check/launch/kill/control other applications, commands to read/write/control storage media, and commands to read/write/control hardware devices. For example, a set flag in a particular registry entry can indicate a patch file is to be installed. In one implementation, the behavior of the application can include the disabling of particular security feature such as an enhanced write filter ("EWF").

Network traffic can also be monitored using the monitoring engine. In one implementation, the network monitor can intercept packet traffic entering and exiting the monitored computer system. In another implementation, the network monitor monitors network traffic entering or leaving a particular computing device. For example, the network monitor can intercept packets including particular commands, for example a command to reboot a computing device in the computer system. A reboot command can indicate that a permanent change to a rebooted device is to take place because the reboot can be used to prepare a computing device for a modification by clearing temporary memory (e.g., RAM). The network monitor can also monitor network traffic for received files, for example received batch files for use in updating an application.

The security device can have one or more different security policies defining triggering conditions for a security action. The one or more security policies can be included in a policy module (e.g., policy module 230) of the security device. The security policies can define one or more events that can indicate a period of increased system vulnerability. In one implementation, a single event can be sufficient to trigger a response from the security engine. In another implementation, a combination of events can be required to trigger a response from the security engine. Alternatively, some particular events can be designated as serious enough to trigger action when occurring alone while other events can be designated as less serious, requiring additional events to trigger a response. For example, in one implementation, any event that disables the operation of a security feature can be sufficient to identify a triggering condition requiring a security response.

Once a triggering condition is identified, the security device can respond according to one or more security policies (step 315). The security device, having a first security state including one or more security policies can adjust one or more security policies resulting in a second security state of the security device. In one implementation, the security engine can dynamically adapt one or more security policies, stored in policy module, to increase protection of the computer system during the time of increased vulnerability. In one implementation, the security engine generates an alert. The alert can be transmitted to a security management device. In another implementation, the security engine can initiate a policy that scans the computer system memory for viruses. Received files for installation (e.g., a patch file) can then be scanned prior to installation.

In one implementation, the security engine activates a security policy limiting access to the affected computing device or devices in the computer system by disabling unnecessary devices. For example, while a patch file is being installed, the security device can disable network adaptors to prevent any system intrusions. In another implementation, the security device can implement a security policy to block network traffic from un-trusted sources while allowing network traffic from other trusted sources. For example, the security policy can allow access to a trusted server providing an update file while blocking access from other network sources. In another implementation, the security device can implement a policy to disable unnecessary devices in order to reduce CPU usage during the period of increased vulnerability. By reducing CPU usage from other devices, the task or tasks being performed as part of the period of increased vulnerability (e.g., installing a patch file) can be completed more quickly. In another implementation, the security device can prevent interruption of one or more processes during the period of increased vulnerability. The security device can therefore allow a process necessary for the completion of the period of increased vulnerability to be run without interruption. For example, the security device can prevent any reboot operation during installation of upgraded computer firmware.

In one implementation, the triggering event or events can include a reboot command. The reboot command causes a reboot of one or more computing devices in the computer system allowing temporary memory sources (e.g., RAM) to be cleared from the rebooted devices in advance of a modification. However, the reboot can also remove any record of the triggering event in the security device. Therefore, the security device can, upon identification of a reboot command, store data in a persistent memory store that records the occurrence of the triggering event. Once the one or more computing devices reboot, the security device can proceed with the appropriate security policy following the occurrence of the reboot event. For example, in one implementation, the reboot command in isolation is insufficient to cause a triggering condition, but a reboot event in combination with one or more other events can lead to an identified triggering condition. Therefore, the security device needs to store the occurrence of the reboot event in order to monitor of the events that cause a triggering condition in combination with the reboot event.

The monitoring engine can continue to monitor the computer system throughout the period of increased vulnerability (step 320). In one implementation, the monitoring engine monitors the computer system for indications that a modification to one or more computing devices in the computer system indicate that the increased vulnerability conditions have passed. The monitoring engine can monitor network traffic in a similar manner as monitoring for triggering events in order to determine that the time of increased vulnerability has ended. For example, when a system update is received from a remote server and installed, the receiving computer typically transmits a message back to the remote server indicating the at the update is complete. The monitoring engine can monitor network traffic using network monitor to identify such a message being transmitted. The monitoring agent can also monitor application behavior to determine an end to the time of increased vulnerability.

In one implementation, once the modification to the computer system is complete, the verification engine can be used to examine the modification in order to verify that the change made match an intended change (step 330). In one implementation, a checksum can be performed to verify the changes. Examining the changes can determine if, for example, a virus or other damaging software was installed instead of a purported patch or update file. If the changes are not verified as correct, the verification engine can alert the security engine. In one implementation, the security engine can quarantine the affected file or files for review, for example, by a user managing the security system. In another implementation, the security engine can restore the affected files or registry keys to an original state prior to the modification.

If the verification engine determines that the change matches the intended change, the security engine can discontinue the enhanced security policies and restore the computer system to a security state prior to the triggering event or events (step 335). For example, the security engine can discontinue a security policy blocking network access with a security policy allowing network access or disabling unnecessary devices. Once the security engine restores the security policies in effect prior to the triggering event or events, the monitoring engine continues to monitor the computer system 100 for a next triggering event or events (step 340).

Embedded Device Protection

In one implementation, a security device can be coupled to an embedded device. Embedded devices are typically closed systems that can include any non-personal computer or computing device that performs a dedicated function or is designed for use with a specific embedded software application. Examples of embedded devices can include ATM machines, cash registers, thin clients, IP telephones, gateways, server appliances, and personal digital assistants ("PDAs").

In one implementation, embedded devices can employ an enhanced write filter ("EWF") to prevent an attacker from making changes to a system. The EWF typically protects a computer system's storage media by redirecting all write operations to another storage location, typically called an overlay. As a result, when an attacker attempts to make changes to an EWF enabled computer system, the changes are only made to the overlay and not to actual content of the storage media. Typically, when an EWF is rebooted, any changes made to the overlay are erased, returning the system to a same configuration as before an attack.

Figure 4:
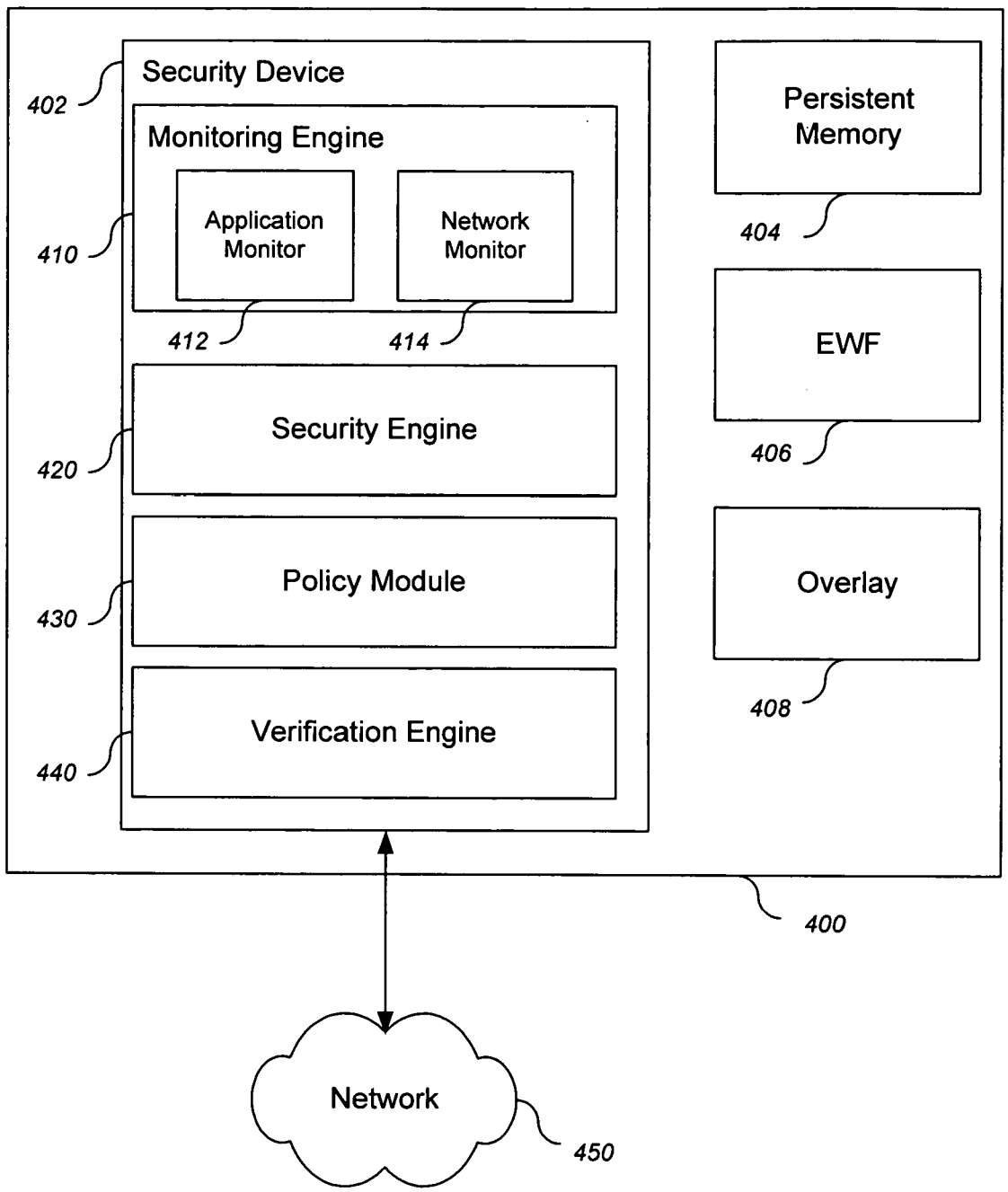
FIG. 4 shows an embedded device.

FIG. 4 shows a security device 402 as a component of an embedded device 400. The embedded device 400 also includes a persistent memory 404, and EWF 406, and an overlay 408. The security device 402 includes a monitoring engine 410, a security engine 420, a policy module 430, and a verification engine 440. The monitoring engine 410 includes an application monitor 412 and a network monitor 414. The security device 402 can be coupled to a network 450 to monitor and protect the embedded device 400 from remote threats. In an alternative implementation, the security device 402 can be a self contained device capable of performing all security functions and coupled to the embedded device 400.

The security device can be one of one or more security devices coupled to a security management device. In one implementation, the one or more security devices protect computing devices positioned at network endpoints including the embedded device 400. The security devices can perform general security functions or can provide specialized security functions in cooperation with other security devices (e.g., a firewall or an intrusion prevention device).

In one implementation, the security device 402 can dynamically adapt one or more security policies using one or more identified security threats or vulnerabilities to the embedded device 400. The security device 402 can monitor the embedded device 400 for one or more events indicating a period of increased vulnerability to attack and adjust the security policies accordingly.

Referring back to FIG. 3, the security device 402 can monitor the embedded device 400 for a triggering event or events indicating a change in the vulnerability of the embedded device 400 (step 305). For example, an embedded device 400 includes the EWF 406. When a new security patch is to be applied to the embedded device 400, the EWF 406 is disabled in order to write the changes to the persistent memory 404 of the embedded device 400 instead of to the overlay 408. As a result the EWF 406 cannot protect the embedded device 400 from attack during the time that the patch is being applied. The security device 402 can identify a triggering condition from one or more events indicating that a security patch to be applied and adopt additional security procedures during the time of patch installation.

The monitoring engine 410 of the security device 402 can monitor the embedded device 400 for one or more events indicating a change in vulnerability in the embedded device 400. The monitoring can include monitoring application behavior, including operation of a security feature such as the EWF 406, using the application monitor 412, monitoring network traffic using the network monitor 414, in addition to using the monitoring engine 410 to monitor one or more a persistent areas of the embedded device's 402 file system.

For example, the monitoring engine 410 can monitor specific registry entries associated with particular applications for changes that indicate that an application is going to request changes to the content of one or more files. In another example, the application monitor can monitor the EWF 406 for a change in operation, for example, a command to disable the EWF. The monitoring engine 410 can also monitor the embedded system for a reboot command. Rebooting the system can be an event indicating that a system change is to take place. In an implementation in which the security device 402 is a component of the embedded device 400 and affected by the reboot, the security device 402 can store information in the persistent memory 404 recording the information regarding the reboot event, as well as any triggered change in the operation of the security device 402, for use by the security system following the reboot.

Network monitor 414 can monitor network communications for events indicating a change in vulnerability of the embedded device 400. For example, packet traffic can be monitored to identify commands or files indicating a system change rendering the embedded device more vulnerable; for example, when the embedded device receives remote commands to reboot or receives a security update patch file to install.

In one implementation, a single monitored event is sufficient to trigger an action by the security engine 420, while in alternative implementations, a combination of events can be necessary in order to trigger an action by the security engine 420. For example, in one implementation, a combination of a command to disable the EWF and a command to reboot the system can result in a triggering condition for the security device 402.

Once a triggering condition has been identified (e.g., step 310) by the monitoring engine 410, the security engine 420 can initiate a change in one or more security policies in order to protect the embedded device 400. The security polices can be included in policy module 430. The security engine 420 can initiate security policy changes resulting in a number of different security actions. For example, a virus scan can be automatically initiated on the persistent memory 404 to ensure that a virus has not infected the embedded device 400. The security system can disable all unnecessary devices in order to tighten the computing environment. A portion or all of the network traffic can be blocked. For example, if a security patch is being installed on the embedded device 400 remotely (e.g., from a security management server) the security engine 420 can block traffic from an untrusted host while retaining network traffic from the trusted server providing the patch.

The monitoring engine 410 can monitor for additional events indicating that the changes to the embedded device 400 that lead to the period of increased vulnerability are completed (e.g., step 320). For example, the network monitor 414 can intercept a packet transmission from the embedded device 400 to a remote server reporting that the patch or other update has been successfully installed. In another implementation, the security agent can detect that the EWF 406 has been reactivated by the embedded device 400.

In one implementation, the security device 402 can use the verification engine 440 to check any changes to files or other data in the embedded device 400 to ensure that any changes made to the embedded device 400 match the intended changes. Verification can include a checksum performed on one or more changed files.

In one implementation, after the monitoring engine 410 determines that the period of increased vulnerability of the embedded device 400 has ended, the security engine 420 can adjust the active security policies from policy module 430 in order to return the security state of the embedded device 400 to the security state prior to the period of increased vulnerability (e.g., step 335). The monitoring engine 410 then continues monitoring the system for a next triggering event or events (e.g., step 340).

BIOS Protection

In an alternative implementation, a security device can detect triggers indicating a modification to be performed on a system's BIOS. Changes to the BIOS represent a highly vulnerable time for the computer device because an attack on the BIOS, during for example, a BIOS update. A BIOS update is a change to the firmware on a computer board integral to the functioning of a computer system. A security system can monitor a computing device for a trigger indicating that the BIOS is to be modified. For example, the security system can detect a BIOS call, which is a special I/O control allowing a write operation to be performed to the BIOS. Upon detection of a BIOS call, the security system can initiate one or more security procedures to provide additional protection during the BIOS write operation. For example, a specified virus scan can be performed to ensure that the BIOS update is legitimate.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 5:
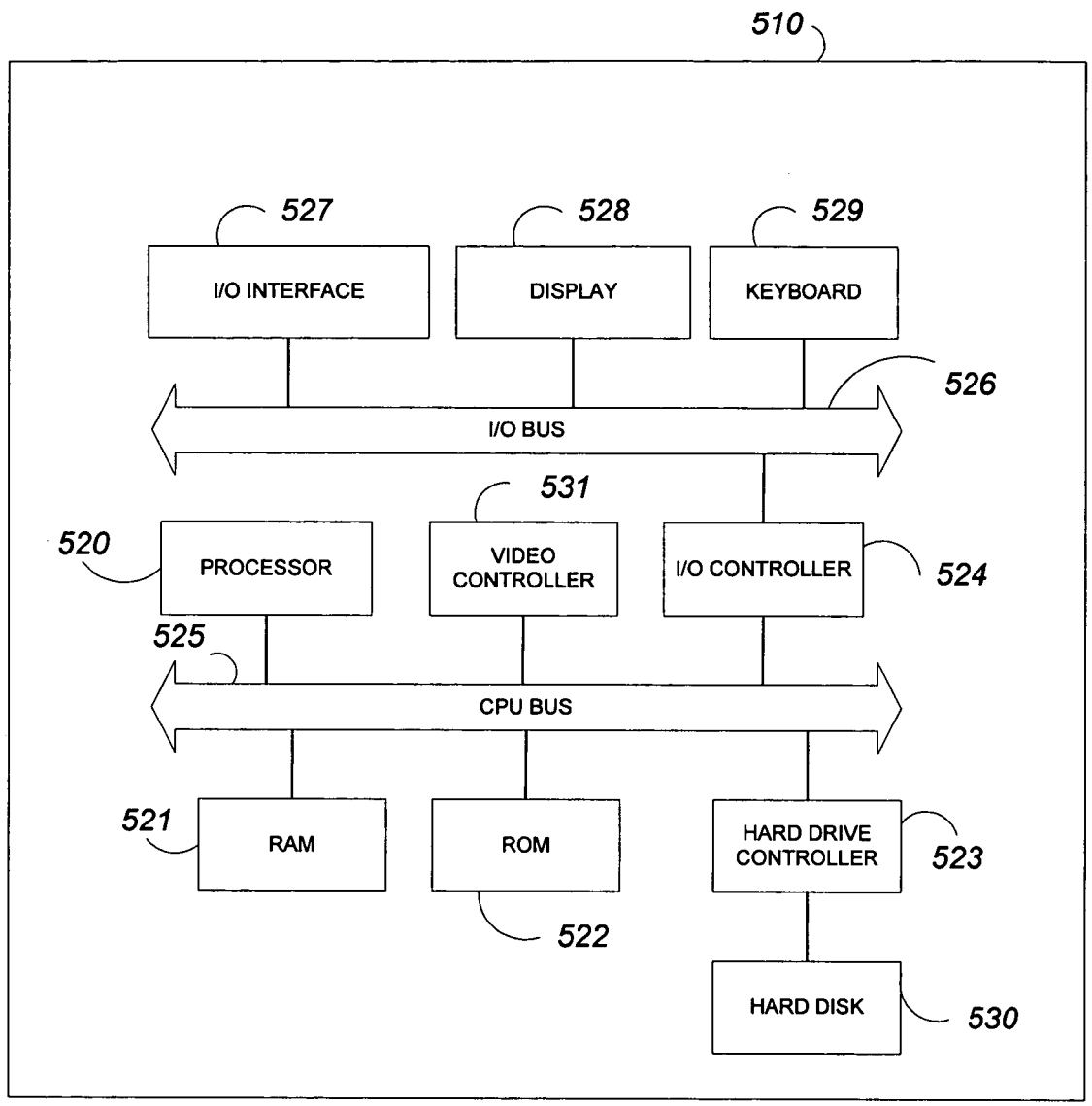
FIG. 5 shows a computer system.

An example of one such type of computer is shown in FIG. 5, which shows a block diagram of a programmable processing system (system) 510 suitable for implementing or performing the apparatus or methods of the invention. The system 510 includes a processor 520, a random access memory (RAM) 521, a program memory 522 (for example, a writable read-only memory (ROM) such as a flash ROM), a hard drive controller 523, a video controller 531, and an input/output (I/O) controller 524 coupled by a processor (CPU) bus 525. The system 510 can be preprogrammed, in ROM, for example, or it can be programmed (and reprogrammed) by loading a program from another source (for example, from a floppy disk, a CD-ROM, or another computer).

The hard drive controller 523 is coupled to a hard disk 530 suitable for storing executable computer programs, including programs embodying the present invention.

The I/O controller 524 is coupled by means of an I/O bus 526 to an I/O interface 527. The I/O interface 527 receives and transmits data (e.g., stills, pictures, movies, and animations for importing into a composition) in analog or digital form over communication links such as a serial link, local area network, wireless link, and parallel link.

Also coupled to the I/O bus 526 is a display 528 and a keyboard 529. Alternatively, separate connections (separate buses) can be used for the I/O interface 527, display 528 and keyboard 529.

The invention has been described in terms of particular embodiments. Other embodiments are within the scope of the following claims. For example, the steps of the invention can be performed in a different order and still achieve desirable results.

What is claimed is:

1. A method, comprising:
   monitoring a computing device having a first security state for one or more events indicating a time period of increased vulnerability, the one or more events comprising receiving an update file from a remote server for installation on the computing device;
   adjusting one or more security policies in response to the one or more events to initiate a second security state comprising restricting network access from network sources other than the remote server;
   identifying an end of the time period of increased vulnerability comprising identifying a message from the computing device to the remote server that the update file has been installed; and
   initiating a third security state.

2. The method of claim 1, the third security state and the first security state being a same security state.

3. The method of claim 1, further comprising:
   verifying changes to the computing device during the time period of increased vulnerability.

4. The method of claim 1, the monitoring further comprising:
   monitoring a behavior of one or more applications.

5. The method of claim 1, the monitoring further comprising:
   monitoring a behavior of an enhanced write filter.

6. The method of claim 1, the monitoring further comprising:
   monitoring input traffic over a network.

7. The method of claim 1, the monitoring further comprising:
   monitoring one or more registry entries.

8. The method of claim 1, the adjusting further comprising:
   initiating a virus scan of the computing device memory.

9. The method of claim 1, the adjusting further comprising:
   disabling unnecessary devices coupled to the computing device.

10. The method of claim 1, the monitoring further comprising:
    monitoring a plurality of computing devices for one or more events indicating a time period of increased vulnerability.

11. A security device, comprising:
    a processor;
    a memory coupled to the processor;
    a monitoring engine operable to monitor a computing device for events indicating a time period of increased vulnerability, the events comprising receiving an update file from a remote server for installation on the computing device;
    a security engine operable to execute one or more security policies including different security policies for different states of the computing device, wherein one of the states comprises restricting network access from network sources other than the remote server;
    the monitoring engine further operable to identify an end of the time period of increased vulnerability comprising identifying a message from the computing device to the remote server that the update file has been installed; and
    a policy module operable to store the one or more security policies.

12. The security device of claim 11, further comprising:
    a verification engine operable to verify one or more changes to the computing device during the time period of increased vulnerability.

13. The security device of claim 11, the monitoring engine further comprising:
    an application behavior monitor; and
    a network monitor.

14. The security device of claim 11, the monitoring engine operable to monitor one or more of a network traffic, a behavior of an application, a file modification, and a registry entry change.

15. The security device of claim 11, wherein the computing device is an embedded device.

16. The security device of claim 11, the security engine operable to dynamically adjust one or more security policies in response to a triggering condition.

17. An embedded device, comprising:
    a security device, comprising:
    a processor;
    a memory coupled to the processor;
    a monitoring engine operable to monitor the embedded device for events indicating a time period of increased system vulnerability, the events comprising receiving an update file from a remote server for installation on the computing device;
    a security engine operable to execute one or more security policies including different security policies for different states of the computing device, wherein one of the states comprises restricting network access from network sources other than the remote server;

the monitoring engine further operable to identify an end of the time period of increased vulnerability comprising identifying a message from the computing device to the remote server that the update file has been installed; and an enhanced write filter operable to write data to an overlay, the events further comprising disabling the enhanced write filter.

18. A computer program product, tangibly stored on a computer-readable storage medium, comprising instructions operable to cause a programmable processor to:

monitor a computing device having a first security state for one or more events indicating a time period of increased vulnerability, the one or more events comprising receiving an update file from a remote server for installation on the computing device;

adjust one or more security policies in response to the one or more events to initiate a second security state comprising restricting network access from network sources other than the remote server;

identify an end of the time period of increased vulnerability comprising identifying a message from the computing device to the remote server that the update file has been installed; and initiate a third security state.

* * * * *